Patented July 28, 1942

2,291,285

UNITED STATES PATENT OFFICE 2,291,285

SULPHONE COMPOUND

Paul Pöhls and Robert Behnisch, Wuppertal-Elberfeld, Germany, assignors to Winthrop Chemical Company, Inc., New York, N. Y., a corporation of New York No Drawing. Application February 27, 1940, Serial No. 321,068. In Germany March 23, 1939

1 Claim. (Cl. 260—397.6)

This invention relates to sulphone compounds which are useful as therapeutics, and to a process of preparing the same.

The 4.4'-diamino-diphenylsulphone and the 4.4'-diacetyldiamino-diphenylsulphone are known by their specific activity against streptococci and pneumococci infections. The therapeutic utility of 4.4'-diamino-diphenylsulphone is affected by giving rise to the formation of methaemoglobin; also the 4.4'-diacetyl-diamino-diphenylsulphone does not comply with all therapeutic requirements.

In accordance with the present invention new products which do not cause the formation of methaeglobin as 4.4'-diamino-diphenylsulphone and which are simultaneously active against bacterial infections, particularly streptococci infections, are obtained by the manufacture of 4-acylamino-diphenylsulphones, the 4'-position of which is substituted by the O₂N- or H₂N-group. According to our invention the said new products are obtainable by reacting upon 4-amino-4'-nitro-diphenylsulphone with an acylating agent, for instance with an acyl halide or acid anhydride; the 4-acylamino-4'-nitro-diphenyl-sulphones thus obtained, if desired, are then converted into the 4-acylamino-4'-aminodiphenylsulphones by reduction while using the usual reducing agents. The said new products are also obtainable by oxidizing 4-acylamino-4'-nitro-diphenylsulphides or -sulphoxides to the 4-acyl amino-4'-nitro-diphenylsulphones; the nitrogroup also in this case may subsequently be reduced to the amino group. The 4-acylamino-4'-nitro-diphenylsulphones further may be obtained by reacting upon an acylaniline with a paranitro-benzenesulphohalide in the presence of a condensing agent according to Friedel-Crafts; the nitro group may thereafter be reduced to the amino group. The 4-acylamino-4'-aminodiphenylsulphones are also obtainable from 4.4'-diamino-diphenylsulphone by reacting upon the latter with a lower aliphatic acid. The 4-acetyl-amino-4'-amino-diphenylsulphone, for instance, is obtained by heating 4.4'-diamino-diphenylsulphone with glacial acetic acid.

The acyl radical is preferably the radical of a lower aliphatic carboxylic acid, such as acetic, propionic and butyric acid, but also other acyl radicals, for instance the benzoyl radical may be used.

The invention is illustrated by the following examples without being restricted thereto:

Example 1

240 grams of 4-acetylamino-4'-nitro-diphenyl-sulphide are suspended in 2500 ccs. of glacial acetic acid and 850 ccs. of a 25% aqueous hydrogen peroxide solution are added thereto. The mixture is stirred at ordinary temperature for 12 hours, whereupon the 4-acetylamino-4'-nitro-diphenylsulphide dissolves. After 8 hours' stirring at 60-65° C. the 4-acetylamino-4'-nitro-diphenylsulphone precipitated is sucked off after cooling, washed with water and dried at 100° C. It melts at 216° C.

The 4-acetylamino-4'-nitro-diphenylsulphide used as starting-material is obtained by gently heating 4-amino-4'-nitro-diphenylsulphide with acetic anhydride.

Example 2

800 grams of iron, 1500 ccs. of water and 10 ccs. of glacial acetic acid are boiled under reflux while stirring and 320 grams of 4-acetylamino-4'-nitro-diphenylsulphone, suspended in 1000 ccs. of dioxane, are added drop by drop. After 4 hours' stirring and boiling the reaction solution is made alkaline by means of potassium carbonate and filtered while hot with animal charcoal.

After dilution with water the 4-acetylamino-4'-amino-diphenylsulphone crystallizes from the filtrate. It melts at 230° C. after filtration with suction, washing with water and drying at 100° C.

Example 3

30 grams of 4.4'-diamino-diphenylsulphone are boiled under reflux in 50 ccs. of glacial acetic acid for 4 hours. The 4-acetyl-amino-4'-amino-diphenylsulphone melting at 228° C. crystallizes after cooling.

Example 4

250 grams of 4-amino-4'-nitro-diphenylsulphone are introduced while stirring into 1000 ccs. of acetic anhydride. After 3 hours' stirring at 60° C. and after cooling the 4-acetylamino-4'-nitro-diphenylsulphone is filtered with suction, washed with ether and dried at 100° C.

The 4-propionylamino-4'-nitro-diphenylsulphone is obtained when using propionic anhydride instead of acetic anhydride.

Example 5

123 grams of 4-nitro-4'-propionylamino-diphenylsulphide are stirred for 12 hours at ordinary temperature with 1250 ccs. of glacial acetic acid and 500 ccs. of 25% aqueous hydrogen peroxide solution and subsequently for 8 hours at 60–65° C. After cooling with ice the 4-nitro-4'-propionylamino-diphenylsulphone is sucked off, washed with water and dried at 100° C. It melts at 190° C.

The 4-nitro-4'-propionylamino-diphenylsulphide used as starting-material which melts at 169° C. is obtained when heating 4-nitro-4'-aminodiphenylsulphide with propionic acid anhydride in glacial acetic acid.

Example 6

132 grams of 4-nitro-4'-methoxyacetylamino-diphenylsulphide are stirred for 12 hours at ordinary temperature with 1250 ccs. of glacial acetic acid and 500 ccs. of 25% aqueous hydrogen peroxide solution and for 8 hours at 60–65° C. After cooling with ice the 4-nitro-4'-methoxyacetylamino-diphenylsulphone is filtered with suction, washed with water and dried at 100° C. It melts at 161° C.

The 4-nitro-4'-methoxyacetylamino-diphenylsulphide used as starting-material which melts at 142° C. is obtained by heating 4-nitro-4'-aminodiphenylsulphide with methoxy-acetic anhydride in glacial acetic acid.

We claim:

The process for producing 4-acetylamino-4'-amino-diphenylsulphone which comprises reacting 4.4'-diamino-diphenylsulphone with glacial acetic acid by boiling the mixture.

PAUL PÖHLS.
ROBERT BEHNISCH.